United States Patent
Ishizaki et al.

(10) Patent No.: US 9,458,361 B2
(45) Date of Patent: Oct. 4, 2016

(54) ADHESIVE COMPOSITION

(71) Applicant: TOAGOSEI CO., LTD., Tokyo (JP)

(72) Inventors: Kenichi Ishizaki, Nagoya (JP); Yushi Ando, Nagoya (JP)

(73) Assignee: TOAGOSEI CO., LTD., Tokyo (JP)

( * ) Notice: Subject to any disclaimer, the term of this patent is extended or adjusted under 35 U.S.C. 154(b) by 0 days.

(21) Appl. No.: 14/650,946

(22) PCT Filed: Dec. 3, 2013

(86) PCT No.: PCT/JP2013/082462
§ 371 (c)(1),
(2) Date: Jun. 10, 2015

(87) PCT Pub. No.: WO2014/091966
PCT Pub. Date: Jun. 19, 2014

(65) Prior Publication Data
US 2015/0315426 A1    Nov. 5, 2015

(30) Foreign Application Priority Data
Dec. 14, 2012    (JP) .................................. 2012-272937

(51) Int. Cl.
C09J 133/22 (2006.01)
C09J 11/06 (2006.01)
C09J 201/00 (2006.01)
C08F 236/12 (2006.01)
C08F 222/32 (2006.01)
C09D 135/04 (2006.01)

(52) U.S. Cl.
CPC ............ *C09J 133/22* (2013.01); *C08F 222/32* (2013.01); *C09D 135/04* (2013.01); *C09J 11/06* (2013.01); *C09J 201/00* (2013.01); *C08F 2222/324* (2013.01); *C08F 2222/328* (2013.01)

(58) Field of Classification Search
CPC ...... C09J 133/22; C09J 11/06; C09J 201/00; C08F 236/12
USPC ....................... 525/295; 526/298, 321, 323.2
See application file for complete search history.

(56) References Cited

U.S. PATENT DOCUMENTS

| 4,460,759 A * | 7/1984 | Robins ............... C09J 4/00 156/331.2 |
| 6,201,088 B1 * | 3/2001 | Gruber ............... C09J 4/00 526/298 |
| 2008/0003196 A1 | 1/2008 | Jonn et al. |
| 2011/0251318 A1 | 10/2011 | Ishizaki et al. |

FOREIGN PATENT DOCUMENTS

| EP | 0 617 100 A1 | 9/1994 | |
| GB | 2 228 943 A | 9/1990 | |
| IE | 2228943 A * | 9/1990 | ............... C09J 4/00 |
| JP | S50-085635 A | 7/1975 | |
| JP | S58-089674 A | 5/1983 | |
| JP | S60-115676 A | 6/1985 | |
| JP | S60-133082 A | 7/1985 | |
| JP | H03-290484 A | 12/1991 | |
| JP | H06-57214 A | 3/1994 | |
| JP | H06-240209 A | 8/1994 | |
| JP | H06-271817 A | 9/1994 | |

OTHER PUBLICATIONS

International Search Report dated Mar. 18, 2014, issued in International Application PCT/JP2013/082462.
Extended European Search Report, mailed Jul. 8, 2016, for European Application No. 13861770.9.

* cited by examiner

*Primary Examiner* — Michael M Bernshteyn
(74) *Attorney, Agent, or Firm* — Fitch, Even, Tabin & Flannery LLP

(57) ABSTRACT

An curable adhesive composition that can form a cured product exhibiting high shear adhesion strength, peel adhesion strength and impact adhesion strength and exhibiting, in particular, excellent cold/hot cycle resistance of adhesion strength, includes (a) a 2-cyanoacrylic acid ester, (b) a high molecular-weight component, such as a polymer, compatible with the 2-cyanoacrylic acid ester, (c) a multifunctional 2-cyano-3-vinylacrylic acid ester, and (d) an onium salt represented by the following general formula (1):

$$C^+A^- \qquad (1)$$

wherein $C^+$ represents an onium cation, $A^-$ represents an anion such provided that the anion does not substantially initiate polymerization of the 2-cyanoacrylic acid, in which the curable adhesive contains components (b)-(d) in predetermined amounts relative to 100 parts by mass of the component (a).

20 Claims, 3 Drawing Sheets

ADHESIVE COMPOSITION

CROSS-REFERENCE TO RELATED APPLICATIONS

This Application is a U.S. National Stage Application filed under 35 U.S.C. §371 of International Application PCT/JP2013/082462, filed Dec. 3, 2013, designating the United States, which claims priority from Japanese Patent Application 2012-272937, filed Dec. 14, 2012, the complete disclosures of which are hereby incorporated herein by reference in their entirety for all purposes.

TECHNICAL FIELD

The present invention relates to an adhesive composition. More specifically, the present invention relates to an adhesive composition containing a 2-cyanoacrylic acid ester, which is high in shear adhesion strength, peel adhesion strength and impact adhesion strength, and is particularly excellent in cold/hot cycle resistance of the adhesion strength.

BACKGROUND ART

An adhesive composition containing a 2-cyanoacrylic acid ester quickly establishes a strong bonding among various types of materials attributed to the unique anion polymerization characteristics exhibited by its principal component, 2-cyanoacrylic acid ester, which initiates polymerization under the presence of weak anion provided by slight moisture or the like attached to a surface of an adherend. Accordingly, it is used as the so-called instantaneous adhesive in a wide range of fields including industrial, medical, and household applications. Because the cured product of this adhesive composition is hard and brittle, it exhibits excellent adhesion strength against shear; however, it is problematic in that peel adhesion strength and impact adhesion strength are low, and particularly cold/hot cycle resistance of the adhesion strength is inferior. To overcome these problems, modification methods have been proposed heretofore, which include adding various types of elastomers and additives (see, for instance, Patent Documents 1 and 2). Also proposed are methods of blending therein a slightly soluble rubber or elastomer particles (e.g., Patent Documents 3 and 4). On the other hand, also known in the art are methods of improving the function of the adhesive by blending a bifunctional 2-cyano-3-vinylacrylic acid ester in the adhesive composition (e.g., Patent Document 5), or blending a phase transfer catalyst having a specific structure in the adhesive composition (e.g., Patent Document 6).

CONVENTIONAL TECHNICAL DOCUMENTS

Patent Documents

Patent Document 1: Japanese Patent Publication (Laid-open) No. Hei. 3-290484.
Patent Document 2: Japanese Patent Publication (Laid-open) No. Hei. 6-57214.
Patent Document 3: Japanese Patent Publication (Laid-open) No. Hei. 6-240209.
Patent Document 4: Japanese Patent Publication (Laid-open) No. Hei. 6-271817.
Patent Document 5: Japanese Patent Publication (Laid-open) No. Sho. 50-85635.
Patent Document 6: British Patent Publication GB2228943 specification.

SUMMARY OF INVENTION

Problems to be Solved by the Invention

The modification methods disclosed in the aforementioned Patent Documents 1 and 2 are still unsatisfactory in that they cannot sufficiently improve the cold/hot cycle resistance of adhesion strength particularly between different types of adherends. Further, the methods described in Patent Documents 3 and 4 mainly aim at improving peel adhesion strength and impact adhesion strength, while leaving the improvement of cold/hot cycle resistance or the like still insufficient. Furthermore, the Patent Document 5 reports on a method of blending a specific bifunctional 2-cyano-3-vinylacrylic acid ester to improve the heat resistance, and Patent Document 6 reports that adhesion rate on wood or paper is increased by adding an onium salt having a specific structure, however, none of them refers to any structure of cured products thereof.

The present invention has been made in light of the above described circumstances, and the objective thereof is to provide an adhesive composition containing a 2-cyanoacrylic acid ester, which is high in shear adhesion strength, peel adhesion strength and impact adhesion strength, and particularly is excellent in cold/hot cycle resistance of the adhesion strength.

Means for Solving the Problems

The present inventors have intensively and extensively studied to solve the aforementioned problems, and as a result, they have found that a composition containing a 2-cyanoacrylic acid ester, a high molecular-weight component, a multifunctional 2-cyano-3-vinylacrylic acid ester, and an onium salt in specific blending amounts thereof forms a specific phase separation structure when cured, and maintains the structure after heat treatment, thereby exhibiting excellent cold/hot cycle resistance particularly. Thus, the present invention has been accomplished.

The present invention is as follows.

1. An adhesive composition which comprises (a) a 2-cyanoacrylic acid ester, (b) a high molecular-weight component compatible with the 2-cyanoacrylic acid ester, (c) a multifunctional 2-cyano-3-vinylacrylic acid ester having 2 or more 2-cyano-3-vinylacryloyl groups, and (d) an onium salt represented by the following general formula (1):

$$C^+A^- \qquad (1)$$

wherein, $C^+$ represents an onium cation and $A^-$ represents an anion which does not substantially initiate polymerization of the 2-cyanoacrylic acid ester,
in which the contents of the components (b), (c), and (d) are from 2 to 50 parts by mass, from 1 to 200 parts by mass, and from 0.01 to 5 parts by mass, respectively, relative to 100 parts by mass of the component (a).

2. The adhesive composition according to the above item 1, wherein the high molecular-weight component (b) is a copolymer resulting from a monomer capable of forming a polymer slightly soluble in the 2-cyanoacrylic acid ester and a monomer capable of forming a polymer soluble in the 2-cyanoacrylic acid ester.

3. The adhesive composition according to item 2, wherein the monomer capable of forming a polymer slightly soluble in the 2-cyanoacrylic acid ester is at least one selected from ethylene, propylene, isoprene, and butadiene, and the monomer capable of forming a polymer soluble in the 2-cyanoacrylic acid ester is at least one of acrylic acid esters and methacrylic acid esters.

4. The adhesive composition according to any one of the above items 1 to 3, wherein the multifunctional 2-cyano-3-vinylacrylic acid ester (c) is an ester of 2-cyano-3-vinylacrylic acid with a polyoxyalkylene polyol, a polyester polyol, a polycarbonate polyol, a polyurethane polyol, a polyamide polyol, a polyester polyamide polyol, an acrylic polyol, a polybutadiene polyol, a hydrogenated polybutadiene polyol, an ethylene-butylene copolymer polyol, a polyisoprene polyol, a hydrogenated polyisoprene polyol, a polyvinyl butyral, a polyvinyl formal, a polyvinyl alcohol, a phenolic resin, or a silane or siloxane compound having hydroxyl groups at both terminals thereof.

5. The adhesive composition according to any one of the above items 1 to 4, wherein the number average molecular weight of the multifunctional 2-cyano-3-vinyl-acrylic acid ester (c) is from 1000 to 50000.

6. The adhesive composition according to any one of the above items 1 to 5, wherein the anion $A^-$ of the onium salt represented by the general formula (1) is a hydrogen sulfate anion, a hydrogen sulfite anion, a sulfonate anion represented by $R^1SO_3^-$ wherein $R^1$ represents an alkyl group, perfluoroalkyl group having 1 to 10 carbon atoms, vinyl group, aryl group, perfluoroaryl group, or halogen atom; or a bis(substituted sulfonyl)imide anion represented by $(R^2SO_2)_2N^-$ wherein $R^2$ represents an alkyl group, perfluoroalkyl group having 1 to 10 carbon atoms, or aryl group.

7. The adhesive composition according to any one of the above items 1 to 6, which, after cured, forms a sea-island structure comprising a dispersed phase resulting from polymerization product of the 2-cyanoacrylic acid ester (a) and a continuous phase resulting from the high molecular-weight component (b), wherein the dispersed phase exhibits a rate of change of the maximum particle diameter of not more than twice after thermal treatment at 60° C.

Effect of the Invention

The adhesive composition according to the present invention contains a 2-cyanoacrylic acid ester, a high molecular-weight component, a multifunctional 2-cyano-3-vinylacrylic acid ester, and an onium salt in specific blending amounts thereof, and thus can forma specific phase separation structure when cured, and can maintain the structure after heat treatment. When the 2-cyanoacrylic acid ester is cured, the adhesive composition undergoes the phase separation between the 2-cyanoacrylic acid ester and the high molecular-weight component to form a sea-island structure having a dispersed phase resulting from polymerization product of the 2-cyanoacrylic acid ester and a continuous phase resulting from the high molecular-weight component. Further, since it contains a multifunctional 2-cyano-3-vinylacrylic acid ester, the polymerization product of the 2-cyanoacrylic acid ester remains fixed as the dispersed phase even after the heat treatment. Furthermore, the specific onium salt added thereto not only accelerates the reaction of the multifunctional 2-cyano-3-vinylacrylic acid ester, but also fixes the sea-island structure. Since the sea-island structure is fixed in the above-described manner, high shear adhesion strength, peel adhesion strength and impact adhesion strength are imparted, and the adhesion strength can be maintained even after durability tests such as heat resistance test, humid heat resistance test, and cold/hot cycle resistance test.

Further, when the high molecular-weight component is a copolymer resulting from a monomer capable of forming a polymer slightly soluble in the 2-cyanoacrylic acid ester and a monomer capable of forming a polymer soluble in the 2-cyanoacrylic acid ester, the adhesive composition possesses high shear adhesion strength, sufficient peel adhesion strength and impact adhesion strength, and more excellent cold/hot cycle resistance.

Furthermore, when the anion of the onium salt represented by the general formula (1) is a hydrogen sulfate anion, a hydrogen sulfite anion, a sulfonate anion represented by $R^1SO_3^-$ (wherein $R^1$ represents an alkyl group, perfluoroalkyl group having 1 to 10 carbon atoms, vinyl group, aryl group, perfluoroaryl group, or halogen atom) or a bis(substituted sulfonyl)imide anion represented by $(R^2SO_2)_2N^-$ (wherein $R_2$ is an alkyl group, perfluoroalkyl group, or aryl group), the curing of the multifunctional 2-cyano-3-vinylacrylic acid ester is further accelerated to strongly fix the phase separation structure, thereby yielding an adhesive composition having more excellent cold/hot cycle resistance.

DESCRIPTION OF EMBODIMENTS

Figure 1:
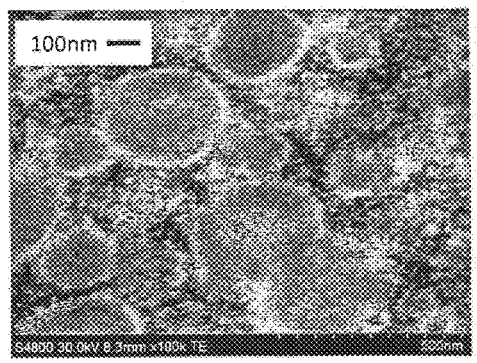
FIG. 1 shows a micrograph of the cured adhesive (initial) obtained in Example 1, taken with a scanning transmission electron microscope.
Figure 2:
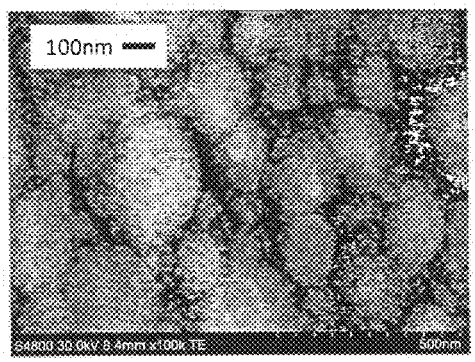
FIG. 2 shows a micrograph of the cured adhesive (after test for cold/hot cycle) obtained in Example 1, taken with a scanning transmission electron microscope.
Figure 3:
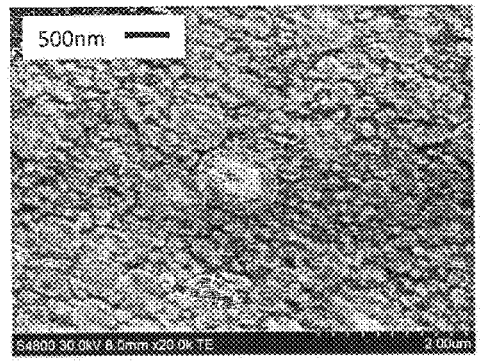
FIG. 3 shows a micrograph of the cured adhesive (initial) obtained in Example 2, taken with a scanning transmission electron microscope.
Figure 4:
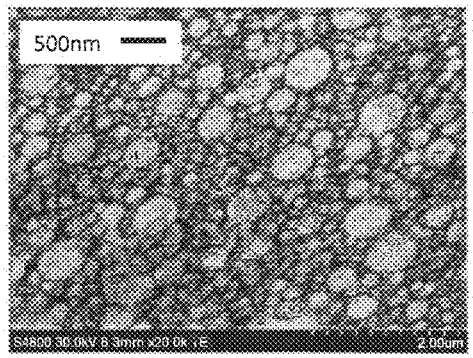
FIG. 4 shows a micrograph of the cured adhesive (after test for cold/hot cycle) obtained in Example 2, taken with a scanning transmission electron microscope.
Figure 5:
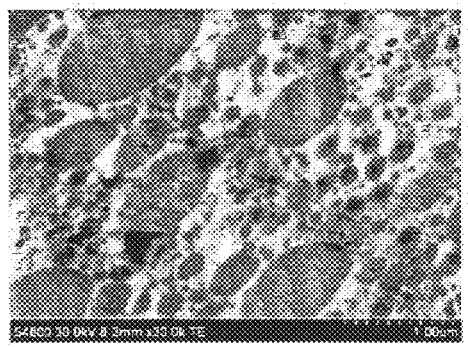
FIG. 5 shows a micrograph of the cured adhesive (initial) obtained in Comparative Example 1, taken with a scanning transmission electron microscope.
Figure 6:
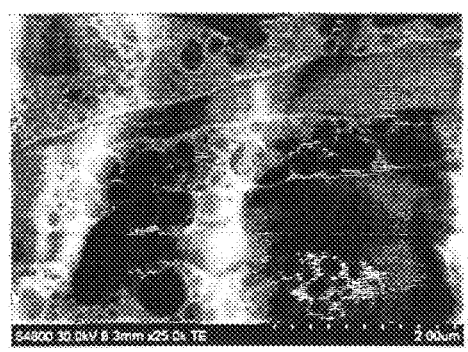
FIG. 6 shows a micrograph of the cured adhesive (after test for cold/hot cycle) obtained in Comparative Example 1, taken with a scanning transmission electron microscope.
Figure 7:
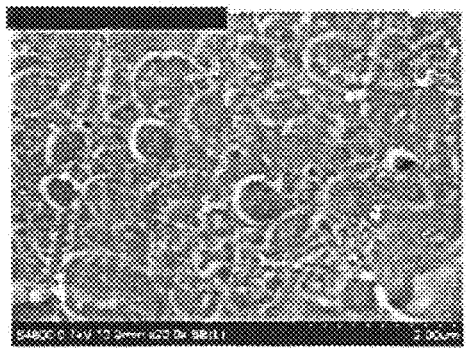
FIG. 7 shows a micrograph of the cured adhesive (initial) obtained in Comparative Example 2, taken with a scanning electron microscope.
Figure 8:
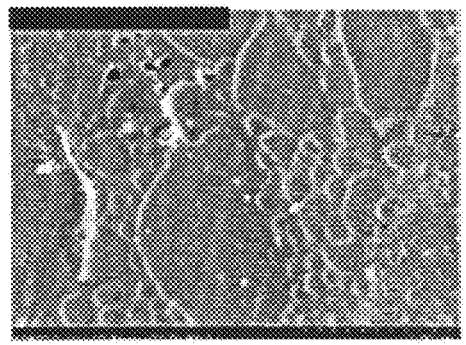
FIG. 8 shows a micrograph of the cured adhesive (after test for cold/hot cycle) obtained in Comparative Example 2, taken with a scanning electron microscope.

Details of the adhesive composition according to the present invention are described below.

The adhesive composition according to the present invention comprises: (a) a 2-cyanoacrylic acid ester, (b) a high molecular-weight component compatible with the 2-cyanoacrylic acid ester, (c) a multifunctional 2-cyano-3-vinylacrylic acid ester having 2 or more 2-cyano-3-vinylacryloyl groups, and (d) an onium salt represented by the aforementioned general formula (1).

As the above-mentioned "(a) 2-cyanoacrylic acid ester", any 2-cyanoacrylic acid ester that has generally been used in this type of adhesive composition can be used without any limitation. The 2-cyanoacrylic acid ester includes, for instance, methyl, ethyl, chloroethyl, n-propyl, i-propyl, allyl, propargyl, n-butyl, i-butyl, n-pentyl, n-hexyl, cyclohexyl, phenyl, tetrahydrofurfuryl, heptyl, 2-ethylhexyl, n-octyl, 2-octyl, n-nonyl, oxononyl, n-decyl, n-dodecyl, methoxyethyl, methoxypropyl, methoxyisopropyl, methoxybutyl, ethoxyethyl, ethoxypropyl, ethoxyisopropyl, propoxymethyl, propoxyethyl, isopropoxyethyl, propoxypropyl, butoxymethyl, butoxyethyl, butoxypropyl, butoxyisopropyl, butoxybutyl, 2,2,2-trifluoroethyl, and hexafluoroisopropyl esters of 2-cyanoacrylic acid. These 2-cyanoacrylic acid esters may be used alone or in a combination of two or more. They can be combined without any limitation, but there can be mentioned exemplary combinations such as ethyl 2-cyanoacrylate with 2-ethoxyethyl 2-cyanoacrylate, isobutyl 2-cyanoacrylate with 2-ethoxyethyl 2-cyanoacrylate, isopropyl 2-cyanoacrylate with 2-octyl 2-cyanoacrylate, isobutyl 2-cyanoacrylate with 2-octyl 2-cyanoacrylate, and the like.

The adhesive composition according to the present invention comprises "(b) a high molecular-weight component". The high molecular-weight component increases peel adhesion strength, impact adhesion strength, and durability such as cold/hot cycle resistance or the like of the adhesive. The aforementioned high molecular-weight component is not particularly limited so long as it is a component compatible with (a) 2-cyanoacrylic acid ester, and undergoes phase separation with polymerization of (a) 2-cyanoacrylic acid ester to form a sea-island structure in which the dispersed phase corresponds to the polymerization product of the (a) 2-cyanoacrylic acid ester, and the continuous phase corresponds to the (b) high molecular-weight component. In the present invention, the term "compatible" refers to a state in which not only the high molecular-weight component and the 2-cyanoacrylic acid ester are mixed in molecular level, but also the composition is maintained to be homogeneous throughout the term of use of the adhesive composition.

The above high molecular-weight component includes those selected from an acrylic acid ester-based copolymer elastomer, a styrene-butadiene copolymer-based elastomer, a polyurethane-based elastomer, a carboxylated acrylonitrile-butadiene copolymer-based elastomer, a polyester-based elastomer, an epichlorohydrin-based elastomer, an ethylene-vinyl acetate copolymer-based elastomer, or the like. They can be used alone or in a combination of two or more.

Furthermore, particularly preferred as the high molecular-weight component is a copolymer resulting from a monomer capable of forming a polymer slightly soluble in 2-cyanoacrylic acid ester and a monomer capable of forming a polymer soluble in 2-cyanoacrylic acid ester. This copolymer comprises a slightly soluble segment formed by polymerization of the monomer capable of forming a polymer slightly soluble in 2-cyanoacrylic acid ester and a soluble segment formed by polymerization of the monomer capable of forming a polymer soluble in 2-cyanoacrylic acid ester.

The monomer capable of forming a polymer slightly soluble in 2-cyanoacrylic acid ester is not particularly limited, and examples thereof include ethylene, propylene, isoprene, butadiene, chloroprene, 1-hexene, cyclopentene, or the like. These monomers can be used alone or in a combination of two or more. As the monomer for forming the slightly soluble polymer, often used are ethylene, propylene, isoprene, butadiene, and chloroprene.

The monomer capable of forming a polymer soluble in 2-cyanoacrylic acid ester also is not particularly limited, and examples thereof include acrylic acid esters, methacrylic acid esters, vinyl chloride, vinyl acetate, vinyl ether, styrene, acrylonitrile, or the like. Examples of the acrylic acid esters include methyl acrylate, ethyl acrylate, n-propyl acrylate, i-propyl acrylate, n-butyl acrylate, i-butyl acrylate, n-hexyl acrylate, n-heptyl acrylate, n-octyl acrylate, 2-ethylhexyl acrylate, methoxyethyl acrylate, methoxypropyl acrylate, ethoxyethyl acrylate, ethoxypropyl acrylate, or the like. These monomers can be used alone, or in a combination of two or more.

Furthermore, examples of the methacrylic acid esters include methyl methacrylate, ethyl methacrylate, n-propyl methacrylate, i-propyl methacrylate, n-butyl methacrylate, i-butyl methacrylate, n-hexyl methacrylate, n-heptyl methacrylate, n-octyl methacrylate, 2-ethylhexyl methacrylate, methoxyethyl methacrylate, methoxypropyl methacrylate, ethoxyethyl methacrylate, ethoxypropyl methacrylate, or the like. These monomers can be used alone or in combination of two or more. An acrylic acid ester and a methacrylic acid ester may be used in combination.

The proportion of the slightly soluble segment formed by polymerization of the monomer capable of forming a slightly soluble polymer and the soluble segment formed by polymerization of the monomer capable of forming a soluble polymer is not particularly limited so long as the slightly soluble segment accounts for 5 to 90 mol %, preferably 10 to 80 mol %, and the soluble segment accounts for 10 to 95 mol %, preferably 20 to 90 mol %, provided that the total of these segments is 100 mol %. More preferable proportion is from 30 to 80 mol % of the slightly soluble segment and from 20 to 70 mol % of the soluble segment; still preferable proportion is from 40 to 80 mol % of the slightly soluble segment and from 20 to 60 mol % of the soluble segment. Particularly preferable proportion is 50 to 75 mol % of the slightly soluble segment and from 25 to 50 mol % of the soluble segment. If the proportion of the slightly soluble segment is from 5 to 90 mol % and that of the soluble segment content is from 10 to 95 mol %, particularly, if the proportion of the slightly soluble segment is from 30 to 80 mol % and that of the soluble segment content is from 20 to 70 mol %, the copolymer can be properly dissolved in 2-cyanoacrylic acid ester to obtain an adhesive composition having excellent cold/hot cycle resistance in addition to high shear adhesion strength or the like.

The proportion of the respective segments can be calculated by integration values for proton measured by proton nuclear magnetic resonance spectroscopy (referred to hereinafter as "H-NMR").

Further, particularly preferred as the above high molecular-weight components is a copolymer comprising a monomer capable of forming a polymer soluble in 2-cyanoacrylic acid ester, a monomer capable of forming a polymer slightly soluble in 2-cyanoacrylic acid ester, and a small amount of a monomer containing a carboxyl group. The monomer containing a carboxyl group is not particularly limited, and examples include acrylic acid, methacrylic acid, maleic acid, fumaric acid, itaconic acid, crotonic acid, cinnamic acid, or the like. These monomers can be used alone or in a combination of two or more. Frequently used as the monomer containing a carboxyl group are acrylic acid and methacrylic acid, which may be used alone or in combination thereof. The segment containing a carboxyl group, which is formed by polymerization of the monomer containing a carboxyl group, is a highly hydrophilic segment soluble in 2-cyanoacrylic acid ester. Furthermore, by using a proper amount of the monomer containing a carboxyl group, higher compatibility can be established between this copolymer and 2-cyanoacrylic acid ester which is hydrophilic.

The proportion of the segment containing a carboxyl group is not particularly limited, however, preferably, it is from 0.1 to 5 mol %, more preferably from 0.3 to 4 mol %, and further preferably from 0.4 to 3 mol %, provided that the total of the slightly soluble segment, the soluble segment, and the segment containing a carboxyl group is 100 mol %. The proportion is further preferably from 0.5 to 2.5 mol %, and particularly preferably, from 0.5 to 2 mol %. So long as the segment containing a carboxyl group is contained in a range of from 0.1 to 5 mol %, particularly preferably from 0.5 to 2.5 mol %, an adhesive composition can be provided which quickly hardens after application to adherends and exhibits excellent cold/hot cycle resistance in combination with high shear adhesion strength.

The proportion of the segment containing a carboxyl group can be measured by potentiometric titration or by indicator titration in accordance with JIS K 0070.

Examples of the copolymer include an ethylene-methyl acrylate copolymer, an ethylene-methyl acrylate-butyl acrylate copolymer, an ethylene-methyl methacrylate copolymer, an ethylene-vinyl acetate copolymer, a butadiene-methyl acrylate copolymer, a butadiene-acrylonitrile copolymer, a butadiene-acrylonitrile-acrylic acid ester copolymer, and a butadiene-styrene-acrylonitrile-methyl acrylate copolymer. Particularly preferred copolymers among them are an ethylene-methyl acrylate copolymer and an ethylene-methyl acrylate-butyl acrylate copolymer. A copolymer resulting from polymerization of monomers used in the above respective copolymers with a monomer containing a carboxyl group, such as acrylic acid and/or methacrylic acid, is also usable. These copolymers may be used alone or in a combination of two or more, or a copolymer free of the monomer containing a carboxyl group may be used in combination with a copolymer using the monomer containing a carboxyl group. Either of the copolymer free of the monomer containing a carboxyl group or the copolymer using the monomer containing a carboxyl group is usable, however, the copolymer free from the monomer containing a carboxyl group is preferably used for a hydrophobic 2-cyanoacrylic acid ester, for instance, one having an alkyl group with 4 or more carbon atoms, particularly 5 or more carbon atoms; on the other hand, the copolymer using the monomer containing a carboxyl group is preferably used for a hydrophilic 2-cyanoacrylic acid ester, for instance, one having an alkyl group with 3 or less carbon atoms, particularly 2 or less carbon atoms or an alkoxyalkyl group.

The average molecular weight of the high molecular-weight component is not particularly limited, however, the number average molecular weight (Mn) is preferably in a range of from 5000 to 500000, particularly preferably from 15000 to 150000, and further preferably from 20000 to 100000. So long as the high molecular-weight component has a number average molecular weight in the range of from 5000 to 500000, the high molecular-weight component easily dissolves in 2-cyanoacrylic acid ester, and particularly an adhesive composition maintaining high adhesion strength after the cold/hot cycle resistance test can be obtained. Further, the weight average molecular weight (Mw) of the high molecular-weight component is preferably in a range of from 5000 to 1000000, particularly from 10000 to 1000000, and Mw/Mn is preferably in a range of from 1.0 to 10.0, and particularly from 1.0 to 8.0.

The average molecular weight in the present invention is measured by gel permeation chromatography (hereinafter, simply referred to as "GPC"). The GPC measurement was carried out by using a polystyrene gel column with tetrahydrofuran as the mobile phase. The molecular weight was obtained as a polystyrene-converted value.

The content of the high molecular-weight component in the adhesive composition is preferably in the range of from 2 to 50 parts by mass per 100 parts by mass of 2-cyanoacrylic acid ester. Although depending on the type of the 2-cyanoacrylic acid ester, the content of the high molecular-weight component is more preferably from 5 to 40 parts by mass, and particularly preferably from 5 to 30 parts by mass. An adhesive composition exhibiting an excellent cold/hot cycle resistance in combination with sufficient shear adhesion strength or the like is provided so long as the content of the high molecular-weight component is in a range of from 2 to 50 parts by mass, particularly in a range of from 5 to 30 parts by mass.

The adhesive composition according to the present invention contains "(c) a multifunctional 2-cyano-3-vinylacrylic acid ester". By virtue of incorporation of the multifunctional 2-cyano-3-vinylacrylic acid ester, the sea-island structure formed by the polymerized product of 2-cyanoacrylic acid ester and the above high molecular-weight component can be maintained even after heat treatment. The multifunctional 2-cyano-3-vinylacrylic acid ester is not particularly limited so long as it has two or more 2-cyano-3-vinylacryloyl groups. Specific examples of the multifunctional 2-cyano-3-vinylacrylic acid ester include 2-cyano-3-vinylacrylic acid esters of a polyoxyalkylene polyol, polyester polyol, polycarbonate polyol, polyurethane polyol, polyamide polyol, polyester polyamide polyol, acrylic polyol, polybutadiene polyol, hydrogenated polybutadiene polyol, ethylene-butyrene copolymer polyol, polyisoprene polyol, hydrogenated polyisoprene polyol, polyvinyl butyral, polyvinyl formal, polyvinyl alcohol, phenolic resin, and a silane or siloxane compound having hydroxyl groups on both terminals thereof. These multifunctional cyanoacrylic acid esters may be used alone or in combination of two or more.

Because of flexibility and toughness of cured products of the multifunctional 2-cyano-3-vinylacrylic acid ester, preferred 2-cyano-3-vinylacrylic acid ester includes those of polyoxyalkylene polyol, polyester polyol, polycarbonate polyol, polyurethane polyol, polyamide polyol, polyester polyamide polyol, acrylic polyol, polybutadiene polyol, hydrogenated polybutadiene polyol, polyisoprene polyol, or hydrogenated polyisoprene polyol, and more preferred are those of polyoxyalkylene polyol, polyester polyol, polycarbonate polyol, polybutadiene polyol, hydrogenated polybutadiene polyol, polyisoprene polyol, or hydrogenated polyisoprene polyol. The polyoxyalkylene polyol is not particularly limited, but usable are polyethylene glycol, polyethylene triol, polyethylene tetraol, polypropylene glycol, polypropylene triol, polypropylene tetraol, polytetramethylene glycol, or the like, and copolymers with the above polyols or other glycols. Similarly, the polyester polyol is not particularly limited, and usable are a generally used polyester polyol generated through the reaction of dibasic acid such as adipic acid with a glycol, triol, or the like, and a polycaprolactone polyol obtained by ring-opening polymerization of caprolactone. Furthermore, the polycarbonate polyol can be used without any restriction, and examples thereof include a generally known polycarbonate diols derived from ethylene carbonate or the like, or a copolymer obtained from a carbonate and a glycol.

The multifunctional 2-cyano-3-vinylacrylic acid ester can be produced by a method known in the art. For instance, as disclosed in Japanese Patent Publication (Laid-open) No.

Sho. 56-47471, it can be obtained by allowing the corresponding cyanoacetate to react with acrolein in the presence of a zinc chloride catalyst.

The number average molecular weight of the multifunctional 2-cyano-3-vinylacrylic acid ester is preferably in a range of from 1000 to 50000, more preferably from 1500 to 40000, particularly preferably from 2000 to 30000, and further preferably from 2000 to 25000. So long as the multifunctional number average molecular weight of the multifunctional cyanoacrylic acid ester is in a range of from 1000 to 50000, it is sufficiently compatible with 2-cyanoacrylic acid ester and provides an adhesive composition that is more homogeneous and exhibits high shear adhesion strength as well as excellent cold/hot cycle resistance.

The content of the multifunctional 2-cyano-3-vinylacrylic acid ester in the adhesive composition is preferably from 1 to 200 parts by mass relative to 100 parts by mass of 2-cyanoacrylic acid ester. Although depending on the types of each of the 2-cyanoacrylic acid ester and the multifunctional 2-cyano-3-vinylacrylic acid ester, the content of the multifunctional 2-cyano-3-vinylacrylic acid ester is preferably in a range of from 1 to 150 parts by mass, more preferably from 1 to 100 parts by mass, and particularly preferably from 1 to 50 parts by mass. If the content of the multifunctional cyanoacrylic acid ester is in a range of from 1 to 200 parts by mass, and particularly from 1 to 50 parts by mass, an adhesive composition having sufficient shear adhesion strength or the like and yet exhibiting excellent cold/hot cycle resistance can be provided.

The adhesive composition according to the present invention contains "(d) an onium salt represented by the following general formula (1)". The onium salt accelerates the reaction of the multifunctional 2-cyano-3-vinylacrylic acid ester, and contributes to fix the sea-island structure:

$$C^+A^- \quad (1)$$

wherein, $C^+$ represents an onium cation and $A^-$ represents an anion which does not substantially initiate polymerization of the 2-cyanoacrylic acid ester.

In the caption above, the sentence "does not substantially initiate polymerization of 2-cyanoacrylic acid ester" means that the composition obtained by mixing the 2-cyanoacrylic acid ester and the onium salt (mass ratio: 100/1) stably remains free of gelation when left to stand for 24 hours at room temperature.

The cations of the onium salt above include an onium cation represented by the following general formula (2), an imidazolium cation, a pyridinium cation, and an onium cation represented by the following general formula (3):

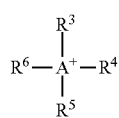

(2)

wherein $R^3$ to $R^6$ each independently represents a non-substituted or substituted alkyl group having from 1 to 20 carbon atoms, cycloalkyl group, aryl group, aralkyl group, alkenyl group or alkynyl group; otherwise, part or all of $R^3$ to $R^6$ may form a non-substituted or substituted 3 to 10 membered ring together with the atom represented by A wherein the ring may contain a hetero atom such as O and S, provided that $R^3$ to $R^6$ which do not involve the formation of the ring are the same as defined hereinbefore; and A represents a nitrogen atom or phosphorus atom. Specific examples of the above substituted alkyl group include, for example, an alkoxy group and an alkanoyl group. When part of $R^3$ to $R^6$ form a ring, the ring is, in general, constituted by 2 to 3 of $R^3$ to $R^6$. Specific examples of the compound represented by the formula (2) in which two of $R^3$ to $R^6$ form a ring include piperidinium cation, morpholinium cation, and pyrrolidinium cation.

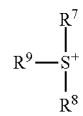

(3)

wherein $R^7$ to $R^9$ each independently represents a non-substituted or substituted alkyl group having from 1 to 20 carbon atoms, cycloalkyl group, aryl group, aralkyl group, alkenyl group or alkynyl group; otherwise, part or all of $R^7$ to $R^9$ may form a non-substituted or substituted 3 to 10 membered ring together with the sulfur atom wherein the ring may contain a hetero atom such as O and S, provided that $R^7$ to $R^9$ which do not involve the formation of the ring are the same as defined hereinbefore. Specific examples of the above substituted alkyl group include, for example, an alkoxy group and an alkanoyl group.

Representative examples of the onium cations represented by the general formula (2) include a quaternary ammonium cation, a quaternary phosphonium cation, and the like.

Specific examples of the quaternary ammonium cations include tetraalkylammonium cations such as tetramethylammonium, ethyltrimethylammonium, diethyldimethylammonium, triethylmethylammonium, tetraethylammonium, tetra-n-butylammonium, trimethyl-n-propylammonium, isopropyl-trimethylammonium, n-butyltrimethylammonium, isobutyltrimethylammonium, t-butyltrimethylammonium, n-hexyltrimethylammonium, dimethyldi-n-propylammonium, dimethyldi-isopropylammonium, isopropyldimethyl-n-propylammonium, methyltri-n-propylammonium, tri-isopropylmethylammonium, isopropylmethyldi-n-propylammonium, methyl-n-propyldiisopropylammonium, triethyl-n-propylammonium, triethylisopropylammonium, n-butyltriethylammonium, triethylisobutylammonium, t-butyltriethylammonium, di-n-butyldimethylammonium, diisobutyldimethylammonium, di-t-butyldimethylammonium, n-butylethyldimethylammonium, isobutylethyldimethylammonium, t-butylethyldimethylammonium, n-butylisobutyldimethylammonium, n-butyl-t-butyldimethylammonium, t-butylisobutyldimethylammonium, diethyldi-n-propylammonium, diethyldiisopropylammonium, diethylisopropyl-n-propylammonium, ethyltri-n-propylammonium, ethyltriisopropylammonium, ethylisopropyldi-n-propylammonium, ethyldiisopropyl-n-propylammonium, diethylmethyl-n-propylammonium, ethyldimethyl-n-propylammonium, ethylmethyldi-n-propylammonium, diethylisopropylmethylammonium, ethylisopropyldimethylammonium, ethyldiisopropylmethylammonium, ethylmethyl-n-propylisopropylammonium, tetra-n-propylammonium, tetra-isopropylammonium, tri-isopropyl-n-propylammonium, diisopropyldi-n-propylammonium, isopropyl-tri-n-propylammonium, butyltrimethylammonium, trimethylpentylammonium, hexyltrimethylammonium, heptyltrimethylammonium, trimethyloctylammonium, trimethylnonylammonium, decyltrimethylammonium, trimethylundecylammonium, dodecyltrimethylammonium, benzyltrimethylammonium, benzyltributylammonium, benzyldodecyldimethylammonium, didecyldimethylammonium, dilauryldimethylammonium, dimethyldistyrylammonium, dimethyldioctadecylammonium, dimethyldioctylammonium, dimethyldipalmitylammonium, ethylhexadecyldimethylammonium, hexyldimethyloctylammonium, dodecyl(ferrocenylmethyl)dimethylammonium, N-methylhomatropinium, and the like; an aromatic substituted ammonium cation such as trimethylphenylammonium, tetraphenylammonium and the like; and aliphatic cyclic ammonium cations such as pyrrolidinium (such as 1,1-dimethylpyrrolidinium, 1-ethyl-1-methylpyrrolidinium, 1,1-diethylpyrrolidinium, 1,1-tetramethylenepyrrolidinium, and 1-butyl-1-methylpyrrolidinium), piperidinium (such as 1,1-dimethylpiperidinium, 1-ethyl-1-methylpiperidinium, 1,1-diethylpiperidinium, and 1-butyl-1-methylpiperidinium), and morpholinium (such as 1,1-dimethylmorpholinium, 1-ethyl-1-methylmorpholinium, and 1,1-diethylmorpholinium).

Specific examples of the quaternary phosphonium cations include cations such as tetramethylphosphonium, triethylmethylphosphonium, and tetraethylphosphonium.

Specific examples of the imidazolium cations include cations such as 1,3-dimethylimidazolium, 1,2,3-trimethylimidazolium, 1-ethyl-3-methylimidazolium, 1-ethyl-2,3-dimethylimidazolium, 1-methyl-3-n-octylimidazolium, 1-hexyl-3-methylimidazolium, 1,3-diethylimidazolium, 1,2-diethyl-3-methylimidazolium, 1,3-diethyl-2-methylimidazolium, 1,2-dimethyl-3-n-propylimidazolium, 1-n-butyl-3-methylimidazolium, 1-n-butyl-2,3-methylimidazolium, 1,2,4-trimethyl-3-n-propylimidazolium, 1,2,3,4-tetramethylimidazolium, 1,2,3,4,5-pentamethylimidazolium, 2-ethyl-1,3-dimethylimidazolium, 1,3-dimethyl-2-n-propylimidazolium, 1,3-dimethyl-2-n-pentylimidazolium, 2-n-heptyl-1,3-dimethylimidazolium, 1,3,4-trimethylimidazolium, 2-ethyl-1,3,4-trimethylimidazolium, 1,3-dimethylbenzimidazolium, 3-methyl-1-phenylimidazolium, 1-benzyl-3-methylimidazolium, 2,3-dimethyl-1-phenylimidazolium, 1-benzyl-2,3-dimethylimidazolium, 1,3-dimethyl-2-phenylimidazolium, 2-benzyl-1,3-dimethylimidazolium, 1,3-dimethyl-2-n-undecylimidazolium, and 1,3-dimethyl-2-n-heptadecylimidazolium.

The pyridinium cations include cations such as 1-methylpyridinium, 1-ethylpyridinium, 1-n-propylpyridinium, 1-isopropylpyridinium, 1-n-butylpyridinium, and 1-n-butyl-3-methylpyridinium.

Specific examples of the tertiary sulfonium cations represented by the general formula (3) above include cations such as trimethylsulfonium, triethylsulfonium, tripropylsulfonium, and triphenylsulfonium.

Among the aforementioned onium cations, preferred are quaternary ammonium cations, imidazolium cations, pyridinium cations, or tertiary sulfonium cations from the viewpoint of exhibiting excellent solubility in 2-cyanoacrylic acid ester and good balance between high curing acceleration property and storage stability of the adhesive composition; and further preferred are quaternary ammonium cations, imidazolium cations, or pyridinium cations.

The anion of the aforementioned onium salt is not particularly limited so long as it does not substantially initiate polymerization of the cyanoacrylate, however, preferred are hydrogen sulfate anion, bisulfite anion, a sulfonate anion represented by $R^1SO_3^-$ (where $R^1$ is an alkyl group, perfluoroalkyl group having from 1 to 10 carbon atoms, cycloalkyl group, vinyl group, aryl group, perfluoroaryl group, aralkyl group, or halogen atom), or a bis(substituted sulfonyl)imide anion represented by $(R^2SO_2)_2N^-$ (where $R^2$ is an alkyl group, perfluoroalkyl group having 1 to 10 carbon atoms, or aryl group). Preferably, the alkyl group represented by $R^1$ or $R^2$ contains from 1 to 20 carbon atoms.

Specific examples of the aforementioned sulfonate anions represented by $R^1SO_3^-$ include anions such as methanesulfonate, ethanesulfonate, propanesulfonate, hexanesulfonate, heptanesulfonate, octanesulfonate, dodecanesulfonate, vinylsulfonate, benzenesulfonate, p-toluenesulfonate, dodecylbenzenesulfonate, 10-camphorsulfonate, pentafluorobenzenesulfonate, fluorosulfonate, chlorosulfonate, and bromosulfonate. The perfluoroalkylsulfonate anions having from 1 to 10 carbon atoms include trifluoromethanesulfonate anion, perfluorobutanesulfonate anion, perfluorooctanesulfonate anion, and the like. The perfluoroalkyl group should have from 1 to 10 carbon atoms, preferably from 1 to 8 carbon atoms, from the viewpoint of solubility of the corresponding onium salt in 2-cyanoacrylic acid ester.

Specific examples of the aforementioned bis(substituted sulfonyl)imide anion represented by $(R^2SO_2)_2N^-$ include bis(perfluoroalkane sulfonyl)imide anions such as bis(methanesulfonyl)imide anion, bis(ethanesulfonyl)imide anion, bis(propanesulfonyl)imide anion, and bis(trifluoromethanesulfonyl)imide anion; bis(pentafluoroethanesulfonyl)imide anion, bis(heptafluoropropane sulfonyl)imide anion, and bis (nonafluorobutanesulfonyl)imide anion.

Among these anions, preferred are hydrogen sulfate anions, perfluoroalkylsulfonate anions, and bis(perfluoroalkane sulfonyl)imide anions from the viewpoint of accelerating the reaction of the multifunctional 2-cyano-3-vinylacrylic acid esters to effectively fix the sea-island structure, and of imparting excellent storage stability to the adhesive composition.

The onium salt used in the present invention is not particularly limited so long as it is a combination of the cations and anions described hereinbefore. Specific examples of the onium salts include tetraethylammonium hydrogensulfate, tetra-n-butylammonium hydrogensulfate, methyltri-n-octyl ammonium hydrogensulfate, amyltriethylammonium hydrogensulfate, benzyltributylammonium hydrogensulfate, benzyldodecyldimethylammonium hydrogensulfate, didecyldimethylammonium hydrogensulfate, dilauryldimethylammonium hydrogensulfate, hexyldimethyloctylammonium hydrogensulfate, dodecyl(ferrocenylmethyl)dimethylammonium hydrogensulfate, cyclohexyltrimethylammonium hydrogensulfate, 1-ethyl-3-methylimidazolium hydrogensulfate, 1-ethyl-2,3-dimethylimidazolium hydrogensulfate, 1-butyl-3-methylimidazolium hydrogensulfate, 1-butyl-2,3-dimethylimidazolium hydrogensulfate, 1-methyl-3-n-octylimidazolium hydrogensulfate, 1-hexyl-3-methylimidazolium hydrogensulfate, 2-ethyl-1,3-dimethylimidazolium hydrogensulfate, 1,3-dimethyl-2-n-propylimidazolium hydrogensulfate, 1,3-dimethyl-2-n-pentylimidazolium hydrogensulfate, 1,3-dimethyl-2-n-heptylimidazolium hydrogensulfate, 1-ethyl-1-methylpiperidinium hydrogensulfate, 1-butyl-1-methylpiperidinium hydrogensulfate, 1-ethyl-1-methylpyrrolidinium hydrogensulfate, 1-butyl-1-methylpyrrolidinium hydrogensulfate, 1-methyl-1-propylpyrrolidinium hydrogensulfate, 1-ethylpyridinium hydrogensulfate, 1-ethyl-3-methylpyridinium hydrogensulfate, 1-butyl-3-methylpyridinium hydrogensulfate, 1-ethyl-4-methylpyridinium hydrogensulfate, 1-butylpyridinium hydrogensulfate, 1-butyl-4-methylpyridinium hydrogensulfate, tetramethylphosphonium hydrogensulfate, triethylmethylphosphonium hydrogensulfate, tetraethylphosphonium hydrogensulfate, tetra-n-butylammonium methanesulfonate, methyltri-n-octylammoniummethanesulfonate, benzyltributylammonium methanesulfonate, benzyldodecyldimethylammonium methanesulfonate, didecyldimethylammonium methanesulfonate, dilauryldimethylammonium methanesulfonate, hexyldimethyloctylammonium methanesulfonate, dodecyl(ferrocenylmethyl)dimethylammonium methanesulfonate, 1-ethyl-3-methylimidazolium methanesulfonate, 1-ethyl-2,3-dimethylimidazolium methanesulfonate, 1-butyl-3-methylimidazolium methanesulfonate, 1-butyl-2,3-dimethylimidazolium methanesulfonate, 1-ethyl-1-methylpiperidinium methanesulfonate, 1-butyl-1-methylpiperidinium methanesulfonate, 1-ethyl-1-methylpyrrolidinium methanesulfonate, 1-butyl-1-methylpyrrolidinium methanesulfonate, 1-methyl-1-propylpyrrolidinium methanesulfonate, 1-ethylpyridinium methanesulfonate, 1-ethyl-3-methylpyridinium methanesulfonate, 1-butyl-3-methylpyridinium methanesulfonate, tetraethylphosphonium methanesulfonate, tetra-n-butylammonium p-toluenesulfonate, methyltri-n-octylammonium p-toluenesulfonate, benzyltributylammonium p-toluenesulfonate, benzyldodecyldimethylammonium p-toluenesulfonate, didecyldimethylammonium p-toluenesulfonate, dilauryldimethylammonium p-toluenesulfonate, hexyldimethyloctylammonium p-toluenesulfonate, dodecyl(ferrocenylmethyl)dimethylammonium p-toluenesulfonate, 1-ethyl-3-methylimidazolium p-toluenesulfonate, 1-ethyl-2,3-dimethylimidazolium p-toluenesulfonate, 1-butyl-3-methylimidazolium p-toluenesulfonate, 1-butyl-2,3-dimethylimidazolium p-toluenesulfonate, 1-ethyl-1-methylpiperidinium p-toluenesulfonate, 1-butyl-1-methylpiperidinium p-toluenesulfonate, 1-ethyl-1-methylpyrrolidinium p-toluenesulfonate, 1-butyl-1-methylpyrrolidinium p-toluenesulfonate, 1-methyl-1-propylpyrrolidinium p-toluenesulfonate, 1-ethylpyridinium p-toluenesulfonate, 1-ethyl-3-methylpyridinium p-toluenesulfonate, 1-butyl-3-methylpyridinium p-toluenesulfonate, tetraethylphosphonium p-toluenesulfonate, tetraethylammonium trifluoromethanesulfonate, tetra-n-butylammonium trifluoromethanesulfonate, methyltri-n-octylammonium trifluoromethanesulfonate, amyltriethylammonium trifluoromethanesulfonate, cyclohexyltrimethylammonium trifluoromethanesulfonate, benzyltributylammonium trifluoromethanesulfonate, benzyldodecyldimethylammonium trifluoromethanesulfonate, didecyldimethylammonium trifluoromethanesulfonate, dilauryldimethylammonium trifluoromethanesulfonate, hexyldimethyloctylammonium trifluoromethanesulfonate, dodecyl(ferrocenylmethyl)dimethylammonium trifluoromethanesulfonate, 1-ethyl-3-methylimidazolium trifluoromethanesulfonate, 1-ethyl-2,3-dimethylimidazolium trifluoromethanesulfonate, 1-butyl-3-methylimidazolium trifluoromethanesulfonate, 1-butyl-2,3-dimethylimidazolium trifluoromethanesulfonate, 1-methyl-3-n-octylimidazolium trifluoromethanesulfonate, 1-hexyl-3-methylimidazolium trifluoromethanesulfonate, 2-ethyl-1,3-dimethylimidazolium trifluoromethanesulfonate, 1,3-dimethyl-2-n-propylimidazolium trifluoromethanesulfonate, 1,3-dimethyl-2-n-pentylimidazolium trifluoromethanesulfonate, 1,3-dimethyl-2-n-heptylimidazolium trifluoromethanesulfonate, 1-ethyl-1-methylpiperidinium trifluoromethanesulfonate, 1-butyl-1-methylpiperidinium trifluoromethanesulfonate, 1-ethyl-1-methylpyrrolidinium trifluoromethanesulfonate, 1-butyl-1-methylpyrrolidinium trifluoromethanesulfonate, 1-methyl-1-propylpyrrolidinium trifluoromethanesulfonate, 1-ethylpyridinium trifluoromethanesulfonate, 1-ethyl-3-methylpyridinium trifluoromethanesulfonate, 1-butyl-3-methylpyridinium trifluoromethanesulfonate, 1-ethyl-4-methylpyridinium trifluoromethanesulfonate, 1-butylpyridinium trifluoromethanesulfonate, 1-butyl-4-methylpyridinium trifluoromethanesulfonate, tetramethylphosphonium trifluoromethanesulfonate, triethylmethylphosphonium trifluoromethanesulfonate, tetraethylphosphonium trifluoromethanesulfonate, tetraethylammonium bis(trifluoromethanesulfonyl)imide, tetra-n-butylammonium bis(trifluoromethanesulfonyl)imide, methyltri-n-octylammonium bis(trifluoromethanesulfonyl)imide, benzyltributylammonium bis(trifluoromethanesulfonyl)imide, benzyldodecyldimethylammonium bis(trifluoromethanesulfonyl)imide, didecyldimethylammonium bis(trifluoromethanesulfonyl)imide, dilauryldimethylammonium bis(trifluoromethanesulfonyl)imide, hexyldimethyloctylammonium bis(trifluoromethanesulfonyl)imide, dodecyl(ferrocenylmethyl)dimethylammonium bis(trifluoromethanesulfonyl)imide, 1-ethyl-3-methylimidazolium bis(trifluoromethanesulfonyl)imide, 1-ethyl-2,3-dimethylimidazolium bis(trifluoromethanesulfonyl)imide, 1-butyl-3-methylimidazolium bis(trifluoromethanesulfonyl)imide, 1-butyl-2,3-dimethylimidazolium bis(trifluoromethanesulfonyl)imide, 1-ethyl-1-methylpiperidinium bis(trifluoromethanesulfonyl)imide, 1-butyl-1-methylpiperidinium bis(trifluoromethanesulfonyl)imide, 1-ethyl-1-methylpyrrolidinium bis(trifluoromethanesulfonyl)imide, 1-butyl-1-methylpyrrolidinium bis(trifluoromethanesulfonyl)imide, 1-methyl-1-propylpyrrolidinium bis(trifluoromethanesulfonyl)imide, 1-ethylpyridinium bis(trifluoromethanesulfonyl)imide, 1-ethyl-3-methylpyridinium bis(trifluoromethanesulfonyl)imide, 1-butyl-3-methylpyridinium bis(trifluoromethanesulfonyl)imide, and triethylsulfonium bis(trifluoromethanesulfonyl)imide.

The onium salt according to the present invention can be obtained by methods known in the art. For instance, they can be prepared from the corresponding onium halides as described in, Hiroyuki Ohno et al., J. Am. Chem. Soc., 2005, 27, 2398-2399; or in Peter Wasserscheid et al., Green Chemistry, 2002, 4, 134-138.

The content of the aforementioned onium salt in the adhesive composition is, preferably from 0.01 to 5 parts by mass, more preferably from 0.02 to 3 parts by mass, and further preferably from 0.03 to 2 parts by mass, per 100 parts by mass of 2-cyanoacrylic acid ester. When the content is less than 0.01 parts by mass, the effect of reaction acceleration for the multifunctional 2-cyano-3-vinylacrylic acid ester cannot be sufficiently exhibited. On the other hand, if the content exceeds 5 parts by mass, the storage stability of the adhesive composition may be impaired.

As described hereinbefore, the adhesive composition according to the present invention contains the components (a) to (d), and when cured, forms a sea-island structure comprising the polymerization product of (a) the 2-cyanoacrylic acid ester as the dispersed phase and (b) the high molecular-weight component as the continuous phase. Furthermore, by virtue of the incorporation of (c) the multifunctional 2-cyano-3-vinylacrylic acid ester and (d) the specific onium salt, the aforementioned sea-island structure is fixed and is maintained even after heat treatment. The size of the aforementioned dispersed phase varies depending on the types and the like of the components (a) and (b), however, it is preferred that the rate of change of the maximum particle diameter of the dispersed phase after heat treatment at 60° C. is twice or less. More preferably, the rate of change of the maximum particle diameter of the dispersed phase is twice or less after heat treatment even at 70° C., and further preferably, the rate of change of the maximum particle diameter of the dispersed phase is twice or less after heat treatment even at 80° C., from the view point of adhesion durability. When the change of the phase structure is small at a temperature of 60° C. or higher, the adhesion strength can be maintained even after the durability tests such as heat resistance, hot humid resistance, cold/hot impact resistance and the like. Similarly, the rate of change is preferably less than twice, more preferably 1.8 times or less. When the rate of change exceeds twice, the adhesion strength tend to drop drastically.

The adhesive composition may contain fumed silica. The fumed silica refers to ultrafine anhydrous silica (having a primary particle size of 500 nm or smaller, particularly from 1 to 200 nm). This anhydrous silica is ultrafine anhydrous silica (having a primary particle size of 500 nm or smaller, particularly from 1 to 200 nm) which is obtained by, for example, oxidizing silicon tetrachloride as a starting material in gas phase under a high temperature flame, and includes two types of silica, namely, hydrophilic silica, and hydrophobic silica. Either of the fumed silica is usable, however, preferred is hydrophobic silica from the viewpoint of dispersibility in 2-cyanoacrylic acid esters and copolymers. Furthermore, it is preferred that a hydrophilic silica is used in combination when the high molecular-weight component is constituted by a copolymer resulting from a larger amount of monomers capable of forming polymers soluble in 2-cyanoacrylic acid ester, i.e., a copolymer containing a larger amount of the soluble segments (which include segments containing a carboxyl group), while a hydrophobic silica is used in combination when the high molecular-weight component is constituted by a copolymer resulting from a larger amount of monomers capable of forming polymers slightly soluble in 2-cyanoacrylic acid ester, i.e., a copolymer containing a larger amount of the slightly soluble segments.

Various types of commercially available hydrophilic silica products can be used; such as Aerosil 50, 130, 200, 300, and 380 (trade names, manufactured by Nippon Aerosil Co., Ltd.). The specific surface areas of the above hydrophilic silicas are 50±15 m$^2$/g, 130±25 m$^2$/g, 200±25 m$^2$/g, 300±30 m$^2$/g, and 380±30 m$^2$/g, respectively. Another usable commercially available hydrophilic silica products include REOLOSIL QS-10, QS-20, QS-30, QS-40 (trade names, manufactured by Tokuyama Corporation), and the like. These hydrophilic silicas have a specific surface area of 140±20 m$^2$/g, 220±20 m$^2$/g, 300±30 m$^2$/g, and 380±30 m$^2$/g, respectively. In addition to above, also usable commercially available products include hydrophilic silicas available from Cabot Corporation and the like.

Further, usable as hydrophobic silica are products generated by surface treatment of hydrophilic silica in which a compound capable of forming a hydrophobic group by reaction with the hydroxyl group that is present on the surface of the hydrophilic silica, or a compound which is adsorbed by the surface of the hydrophilic silica to form a hydrophobic layer thereon, is brought into contact with the hydrophilic silica in the presence or absence of a solvent, preferably, with heating.

The compounds for use in surface treatment of the hydrophilic silica to render it hydrophobic include various types of alkyl-, aryl-, and aralkyl-based silane coupling agents having hydrophobic groups, such as an-octyl trialkoxysilane and the like; silylating agents such as methyltrichlorosilane, dimethyldichlorosilane, hexamethyldisilazane and the like; silicone oils such as polydimethylsiloxane and the like; higher alcohols such as stearyl alcohol and the like; and higher fatty acids such as stearic acid and the like. Any of the products rendered hydrophobic using the above compounds can be used as the hydrophobic silica.

Examples of the commercially available hydrophobic silica include Aerosil RY200 and R202, which are rendered hydrophobic by surface treatment using silicone oil; Aerosil R974, R972, and R976, which are rendered hydrophobic by surface treatment using a dimethylsilylating agent; Aerosil R805, which is rendered hydrophobic by surface treatment using n-octyltrimethoxysilane; Aerosil R811 and R812, which are rendered hydrophobic by surface treatment using a trimethylsilylating agent (which are all manufactured by Nippon Aerosil Co., Ltd., and are given by trade names). Another example include REOLOSIL MT-10 (trade name, manufactured by Tokuyama Corporation), which is rendered hydrophobic by surface treatment using methyltrichlorosilane. The specific surface areas of these hydrophobic silicas are 100±20 m$^2$/g, 100±20 m$^2$/g, 170±20 m$^2$/g, 110±20 m$^2$/g, 250±25 m$^2$/g, 150±20 m$^2$/g, 150±20 m$^2$/g, 260±20 m$^2$/g, and 120±10 m$^2$/g, respectively.

The content of the fumed silica in the adhesive composition is in a range of from 1 to 30 parts by mass per 100 parts by mass of 2-cyanoacrylic acid ester. The preferred content of the fumed silica depends on the type of the 2-cyanoacrylic acid ester, the types and proportion of the monomers used for the production of the copolymer, the type of the fumed silica and the like, however, it is in a range of from 1 to 25 parts by mass, and particularly from 2 to 20 parts by mass. When the content of the fumed silica is in a range of from 1 to 30 parts by mass, an adhesive composition easy to handle can be obtained without impairing curability, adhesion strength, or the like.

In addition to the aforementioned components, the adhesive composition according to the present invention may contain anion polymerization accelerators, stabilizers, plasticizers, thickeners, particles, colorants, fragrances, solvents, strength improvers and the like which have conventionally been blended in the adhesive compositions containing a 2-cyanoacrylic acid ester, according to purposes, in proper quantities within the ranges that do not impair curability, adhesion strength or the like of the adhesive composition.

Examples of the anion polymerization accelerators include polyalkylene oxides, crown ethers, silacrown ethers, calixarenes, cyclodextrins, and pyrogallol-based cyclic compounds. The polyalkylene oxides refer to polyalkylene oxides and the derivatives thereof, and examples thereof include those disclosed in Japanese Patent Publication (Kokoku) No. Sho. 60-37836, Japanese Patent Publication (Kokoku) No. Hei. 1-43790, Japanese Patent Publication (Laid-Open) No. Sho. 63-128088, Japanese Patent Publication (Laid-Open) No. Hei. 3-167279, U.S. Pat. No. 4,386, 193, and U.S. Pat. No. 4,424,327. Concrete examples thereof include (1) polyalkylene oxides such as diethylene glycol, triethylene glycol, polyethylene glycol, and polypropylene glycol; and (2) derivatives of polyalkylene oxides such as polyethylene glycol monoalkyl esters, polyethylene glycol dialkyl esters, polypropylene glycol dialkyl esters, diethylene glycol monoalkyl ethers, diethylene glycol dialkyl ethers, dipropylene glycol monoalkyl ethers, and dipropylene glycol dialkyl ethers. Examples of the crown ethers include those disclosed in, for instance, Japanese Patent Publication (Kokoku) No. Sho. 55-2236 and Japanese Patent Publication (Laid-Open) No. Hei. 3-167279. Concrete examples thereof include 12-crown-4, 15-crown-5, 18-crown-6, benzo-12-crown-4, benzo-15-crown-5, benzo-18-crown-6, dibenzo-18-crown-6, dibenzo-24-crown-8, dibenzo-30-crown-10, tribenzo-18-crown-6, asym-dibenzo-22-crown-6, dibenzo-14-crown-4, dicyclohexyl-24-crown- 8, cyclohexyl-12-crown-4, 1,2-decalyl-15-crown-5, 1,2-naphtho-15-crown-5, 3,4,5-naphthyl-16-crown-5, 1,2-methylbenzo-18-crown-6, 1,2-tert-butyl-18-crown-6, and 1,2-vinylbenzo-15-crown-5. Examples of the silacrown ethers include, for example, those disclosed in Japanese Patent Publication (Laid-Open) No. Sho. 60-168775. Concrete examples thereof include dimethylsila-11-crown-4, dimethylsila-14-crown-5, and dimethylsila-17-crown-6. Examples of the calixarenes include those disclosed in Japanese Patent Publication (Laid-Open) No. Sho. 60-179482, Japanese Patent Publication (Laid-Open) No. Sho. 62-235379, and Japanese Patent Publication (Laid-Open) No. Sho. 63-88152. Concrete examples thereof include 5,11,17,23,29,35-hexa-tert-butyl-37,38,39,40,41,42-hexahydroxycalix[6]arene, 37,38,39,40,41,42-hexahydroxycalix[6]arene, 37,38,39,40,41,42-hexa-(2-oxo-2-ethoxy)-ethoxycalix[6]arene, 25,26,27,28-tetra-(2-oxo-2-ethoxy)-ethoxycalix[4]arene, and tetrakis(4-t-butyl-2-methylenephenoxy)ethyl acetate. Examples of the cyclodextrins include those disclosed in Japanese Patent Publication (Kohyo) No. Hei. 5-505835. Concrete examples thereof include α-, β-, or γ-cyclodextrins. Examples of the pyrogallol-based cyclic compounds include compounds disclosed in Japanese Patent Publication (Laid-Open) No. 2000-191600. Concrete examples thereof include 3,4,5,10,11,12,17,18,19,24,25,26-dodecaethoxycarbomethoxy-C-1,C-8,C-15,C-22-tetramethyl[14]-metacyclophane. These anion polymerization accelerators may be used alone or in combination of two or more thereof. The blending amount of the anion polymerization accelerators is preferably from 0.005 to 5 parts by mass, and more preferably from 0.01 to 2 parts by mass per 100 parts by mass of 2-cyanoacrylic acid ester.

The stabilizers include (1) anion polymerization inhibitors, such as sulfur dioxide, aliphatic sulfonates such as methanesulfonate, aromatic sulfonates such as p-toluenesulfonate, boron trifluoride complexes such as boron trifluoride methanol and boron trifluoride diethyl ether, $HBF_4$, and trialkyl borate; and (2) radical polymerization inhibitors such as hydroquinone, hydroquinone monomethyl ether, t-butylcatechol, catechol, and pyrogallol. These stabilizers may be used alone, or in a combination of two or more.

A plasticizer may be incorporated so long as the effect of the invention is not impaired; when the high molecular-weight component is constituted by, in particular, a copolymer resulting from a larger amount of monomers capable of forming the slightly soluble polymers, i.e., a copolymer containing a larger amount of the slightly soluble segments (a copolymer containing 65 mol % or more of the slightly soluble segments), the addition of the plasticizer in a proper quantity improves the solubility thereof. The plasticizer includes triethyl acetyl citrate, tributyl acetyl citrate, dimethyl adipate, diethyl adipate, dimethyl sebacate, dimethyl phthalate, diethyl phthalate, dibutyl phthalate, diisodecyl phthalate, dihexyl phthalate, diheptyl phthalate, dioctyl phthalate, bis(2-ethylhexyl) phthalate, diisononyl phthalate, diisotridecyl phthalate, dipentadecyl phthalate, dioctyl terephthalate, diisononyl isophthalate, decyl toluate, bis(2-ethylhexyl) camphorate, 2-ethylhexylcyclohexyl carboxylate, diisobutyl fumarate, diisobutyl maleate, caproic triglyceride, 2-ethylhexyl benzoate, and dipropylene glycol dibenzoate. Among them, preferred from the viewpoint of good compatibility with 2-cyanoacrylic acid ester and of high plasticizing efficiency are tributyl acetyl citrate, dimethyl adipate, dimethyl phthalate, 2-ethylhexyl benzoate, and dipropylene glycol dibenzoate. These plasticizers may be used alone or in combination of two or more. The content of the plasticizers is not particularly limited, however, the range thereof is preferably from 3 to 50 parts by mass, particularly preferably from 10 to 45 parts by mass, and further preferably from 20 to 40 parts by mass per 100 parts by mass of 2-cyanoacrylic acid ester. So long as the content of the plasticizer is in a range of from 3 to 50 parts by mass, especially when the copolymer is such containing the slightly soluble segments in a larger quantity, the copolymer can be easily dissolved in 2-cyanoacrylic acid ester, and particularly, the retention rate of the adhesive strength after cold/hot cycle resistance test can be improved.

Further, the thickeners include polymethyl methacrylates, copolymers of methyl methacrylate and an acrylate, copolymers of methyl methacrylate and another methacrylate, acrylic rubbers, polyvinylchloride, polystyrene, cellulose esters, polyalkyl-2-cyanoacrylate, and ethylene-vinyl acetate copolymers. These thickeners may be used alone or in combination of two or more.

The particles blended in the adhesive composition control the layer thickness of the adhesive agent. The average particle diameter is preferably from 10 to 200 μm, particularly preferably from 15 to 200 μm, and further preferably from 15 to 150 μm. The material of the particles is not particularly limited so long as it is insoluble in 2-cyanoacrylic acid ester, and as it does not lead to modifications such as polymerization. Examples of the material include thermoplastic resins such as polyethylene, polypropylene, polymethylpentene, polyvinyl chloride, polytetrafluoroethylene, polyethylene terephthalate, polybutylene terephthalate, polysulfone, and polyphenylene oxide; crosslinked resins such as unsaturated polyester, divinylbenzene polymer, divinylbenzene-styrene copolymer, divinylbenzene-(meth)acrylate copolymer, and diaryl phthalate polymer; inorganic compounds such as spherical silica, glass beads, and glass fibers; silicone compounds; and organic-inorganic complex particles having an organic polymer skeleton and a polysiloxane skeleton. The content of the particles is not particularly limited, however, the range thereof is preferably from 0.1 to 10 parts by mass, particularly preferably from 1 to 5 parts by mass, and further preferably from 1 to 3 parts by mass, per 100 parts by mass of the 2-cyanoacrylic acid ester. When the content of the particles is in a range of from 0.1 to 10 parts by mass, the influence of the particles on curing rate or adhesion strength can be reduced.

The average particle diameter of the particles according to the present invention is measured by an electrical sensing zone (Coulter principle) particle size distribution analyzer or a laser diffraction particle size distribution analyzer.

EXAMPLES

The present invention is explained in further detail by way of Examples below.

[1] Synthesis (i) Synthesis of Multifunctional
2-Cyano-3-Vinylacrylic Acid Ester Synthesis Example 1

Compound A

In a 500-ml flask equipped with a stirrer, a thermometer, a Liebig condenser, a nitrogen gas blower, and a dropping funnel were charged 4.60 g (45.2 mmol) of cyanoacetyl chloride and 210 ml of benzene. Then, after heating the reaction system to 60° C., a solution obtained by dissolving 50.0 g (equivalent ratio (acid chloride/OH group)=1.4) of polypropylene glycol (number average molecular weight: 4000 (specification value), polyether triol type, manufactured by Adeka Corporation, "ADEKA polyether G-4000" (trade name)) into 50 ml of benzene was added while blowing nitrogen gas through the nitrogen gas blower. The resulting product was stirred for 30 minutes while maintaining the temperature at 60° C. Then, after cooling the resulting product to room temperature (from 15 to 35° C.), benzene was distilled off under reduced pressure to obtain 51.5 g of a multifunctional cyanoacetate as a colorless viscous oily product.

Next, 4.28 g (31.4 mmol) of zinc chloride, 44.0 g of the above-obtained multifunctional cyanoacetate, 0.033 g of hydroquinone, and 60 ml of dioxane were charged into a 200-ml flask equipped with a stirrer, a thermometer, a Liebig condenser, a nitrogen gas blower, and a dropping funnel, which were followed by cooling with ice. Then, while ice-cooling and stirring, 9.56 ml (62.8 mmol) (equivalent ratio (acrolein/cyanoacetyl group)=2/1) of 90% acrolein was dropped into the resulting product, and stirring was further continued for 12 hours at room temperature. The thus-obtained reaction solution was slowly poured into 120 ml petroleum ether and 90 ml of 1% sulfurous acid solution while ice-cooling and vigorously stirring, and stirring was continued for 1 hour. After drying off the organic phase over anhydrous magnesium sulfate, the resulting product was condensed under reduced pressure to obtain 42.1 g of a colorless viscous oily multifunctional 2-cyano-3-vinylacrylic acid ester A (number average molecular weight 5240).

Benzene and dioxane as referred herein were dry benzene and dry dioxane, and the glass wares were sufficiently dried under heat prior to use.

Synthesis Example 2

Compound B

Multifunctional 2-cyano-3-vinylacrylic acid ester B (number average molecular weight 3490) was synthesized in the same manner as in Synthesis Example 1, except that a polypropylene glycol with a different number average molecular weight (number average molecular weight: 3000 (specification value), having hydroxyl groups at both terminals, manufactured by ADEKA CORPORATION, "ADEKA polyol P-3000" (trade name)) was used in place of the polypropylene glycol used in Synthesis Example 1, and the charge amounts were changed according to the number average molecular weight and the number of functional group of the compound.

Synthesis Example 3

Compound C

Multifunctional 2-cyano-3-vinylacrylic acid ester C (number average molecular weight 15060) was synthesized in the same manner as in Synthesis Example 1, except that a polypropylene glycol with a different number average molecular weight (number average molecular weight: 10000 (specification value), having hydroxyl groups at both terminals, manufactured by Asahi Glass Co., Ltd., "PREMINOL S-4011" (trade name)) was used in place of the polypropylene glycol used in Synthesis Example 1, and the charge amounts were changed according to the number average molecular weight and the number of functional group of the compound.

(ii) Synthesis of Onium Salt

Synthesis Example 4

Methyltri-n-Octyl Ammonium Trifluoromethanesulfonate

Synthesis was carried out using methyltri-n-octyl ammonium chloride (reagent, manufactured by Tokyo Chemical Industry Co., Ltd.), in accordance with the report of Hiroyuki Ohno et al. (J. Am. Chem. Soc., 2005, 27, pp 2398-2399).

[2] Production of Adhesive Composition

Example 1

After blending 40 ppm of sulfur dioxide, 100 ppm of 18-crown-6, and 1000 ppm of hydroquinone with isobutyl 2-cyanoacrylate (provided that isobutyl 2-cyanoacrylate is 100 parts by mass), an ethylene/methylacrylate copolymer (manufactured by DuPont, "Vamac DP" (trade name)) shown in Table 1, the multifunctional 2-cyano-3-vinylacrylic acid ester A obtained in Synthesis Example 1, the onium salt X obtained in Synthesis Example 4, and fumed silica (manufactured by NIPPON AEROSIL CO., LTD., "Aerosil RY200" (trade name)) were further blended therein at contents described in Table 1. The resulting blend was stirred to mix at the temperature range of from 20 to 40° C. for 15 minutes to obtain an adhesive composition.

Examples 2 to 7 and Comparative Examples 1 to 5

Adhesive compositions were each produced in the same manner as in Example 1, except that the type of 2-cyanoacrylic acid ester, the type and content of the high molecular-weight component, the type and content of 2-cyano-3-vinylacrylic acid ester, the type and content of onium salt, the type and content of fumed silica, and the types and contents of the other additives were changed as shown in Table 1.

In Table 1, the abbreviations represent the following compounds:

Onium salt X: The methyltri-n-octyl ammonium trifluoromethanesulfonate synthesized in Synthesis Example 4.

Onium salt Y: Methyltri-n-octyl ammonium bis(trifluoromethanesulfonyl)imide (reagent)

Onium salt Z: 1-butyl-3-methylimidazolium hydrogensulfate (reagent)

O-15: 15-crown-5 (reagent)

TABLE 1

| | | 2-Cyanoacrylic acid ester | High molecular-weight component Type | High molecular-weight component Content (parts by mass) | Multifunctional 2-cyano-3-vinyl acrylic acid ester Type | Multifunctional 2-cyano-3-vinyl acrylic acid ester Content (parts by mass) | Onium salt Type | Onium salt Content (parts by mass) | Fumed silica Type | Fumed silica Content (parts by mass) | Other additives Type | Other additives Content (parts by mass) |
|---|---|---|---|---|---|---|---|---|---|---|---|---|
| Examples | 1 | Isobutyl 2-cyanoacrylate | Vamac DP | 20 | A | 10 | X | 0.3 | Aerosil RY200 | 6 | O-15 | 0.5 |
| | 2 | Isobutyl 2-cyanoacrylate | Vamac DP | 20 | A | 10 | X | 0.3 | Aerosil R974 | 6 | — | — |
| | 3 | Isobutyl 2-cyanoacrylate | Vamac DP | 20 | A | 3.3 | X | 0.3 | Aerosil RY200 | 5 | O-15 | 0.5 |
| | 4 | Isobutyl 2-cyanoacrylate | Vamac DP | 20 | A | 20 | X | 0.3 | Aerosil RY200 | 5 | O-15 | 0.5 |
| | 5 | Isobutyl 2-cyanoacrylate | Vamac DP | 20 | B | 10 | Z | 0.03 | Aerosil RY200 | 5 | O-15 | 0.5 |
| | 6 | Isobutyl 2-cyanoacrylate | Vamac DP | 20 | C | 10 | X | 0.3 | Aerosil RY200 | 5 | O-15 | 0.5 |
| | 7 | Ethoxyethyl 2-cyanoacrylate | Vamac MR | 15 | A | 10 | Y | 0.3 | Aerosil RY200 | 5 | O-15 | 0.5 |
| Comparative Examples | 1 | Ethoxyethyl 2-cyanoacrylate | Vamac MR | 15 | — | — | — | — | Aerosil RY200 | 6 | — | — |
| | 2 | Isobutyl 2-cyanoacrylate | Vitax V6702 | 10 | — | — | — | — | — | — | — | — |
| | 3 | Isobutyl 2-cyanoacrylate | Vamac DP | 20 | — | — | — | — | Aerosil RY200 | 5 | O-15 | 0.5 |
| | 4 | Isobutyl 2-cyanoacrylate | Vamac DP | 20 | — | — | Z | 0.03 | Aerosil RY200 | 5 | O-15 | 0.5 |
| | 5 | Isobutyl 2-cyanoacrylate | Vamac DP | 20 | B | 10 | — | — | Aerosil RY200 | 5 | O-15 | 0.5 |

In Table 2 are given the composition, the number average molecular weight, and the weight average molecular weight of the "Vamac" (trade name, manufactured by DuPont) series used in Example 1-7 and Comparative Examples 1 and 3 to 5 and the "VITAX V6702" (trade name, manufactured by Hitachi Chemical Co., Ltd.) used in Comparative Example 2.

In Table 2, "E", "MA", "AA", "AN", "BA", and "St" each stand for ethylene, methyl acrylate, acrylic acid, acrylonitrile, butyl acrylate, and styrene, respectively.

Further, in determining the composition of the copolymers, the ratios of ethylene and acrylic acid esters were obtained by the aforementioned $^1$H-NMR measurement (using model "ECA-400" manufactured by JEOL Ltd.) in the condition that deuterochloroform was used as the solvent, and the temperature was set to room temperature. The compositional ratio of acrylic acid was obtained by acid value measurement in accordance with JIS K 0070.

The average molecular weight was measured by GPC (model "Alliance 2695", manufactured by WATERS) under the conditions that two columns ("TSKgel SuperMultiporeHZ-H" (trade name), manufactured by Tosoh Corporation) were connected to two columns ("TSKgel SuperHZ-2500" (trade name), manufactured by Tosoh Corporation), tetrahydrofuran was used as the mobile phase, measurement was performed at a temperature of 40° C., and the molecular weight was obtained as a polystyrene-converted value.

TABLE 2

| High molecular-weight component | Copolymer composition (mol %) | | | | Average Molecular Weight ($\times 10^4$) | |
|---|---|---|---|---|---|---|
| | E | MA | AA | BA | Mn | Mw |
| Vamac DP | 65.3 | 34.7 | 0 | 0 | 5.2 | 31.4 |
| Vamac MR | 69.2 | 30.0 | 0.8 | 0 | 5.2 | 24.0 |
| Vitax V6702 | AN/BA/St copolymer | | | | 5.4 | 16.7 |

[3] Production of Cured Adhesive

The adhesive compositions each obtained in Examples 1 to 7 and in Comparative Examples 1 to 5 were coated (at a thickness of from 20 to 50 μm) on a hard-to-bond material, i.e., a polyethylene substrate, and were allowed to stand still at a temperature of 23° C. and a humidity of 60% RH for 7 days to obtain a completely hardened product. Thereafter, the resulting hardened body was carefully peeled off to obtain the cured adhesives (which are denoted as "initial", hereinafter). Then, by using a cold/hot impact testing machine, the cured adhesive was subjected to the hot/cold cycle in which it was maintained at −40° C. for an hour and then at 80° C. for an hour, and the cycle was repeated ten times (which is denoted as "after test", hereinafter).

[4] Observation of Cured Adhesive

Examples 1 to 7 and Comparative Examples 1 to 5

Ultrathin cross sections of the cured adhesives thus obtained by the above methods were observed under a field emission scanning electron microscope (model "S-4800", manufactured by Hitachi, Ltd., observation method was "SEM" or "STEM" as denoted below).

The observation was carried out on a plurality of sites of the same cured product, and by hypothetically setting a true circle equivalent to the dispersed phase having the largest area found in the above sites, the diameter of the true circle was taken as the maximum particle diameter of the dispersed phase. The area of the dispersed phase can be obtained by multiplying the radius of the major axis by the radius of the minor axis times π.

TABLE 3

| | | | Sea-Island structure | | Maximum particle diameter of the dispersed phase | | |
|---|---|---|---|---|---|---|---|
| | | Observation Method | Continuous Phase | Dispersed phase | Initial | After test | Rate of change |
| Examples | 1 | Cross section/ STEM | Component (b) | Polymerized component (a) | 380 nm | 420 nm | 1.1 times |
| | 2 | Cross section/ STEM | Component (b) | Polymerized component (a) | 1.2 μm | 0.7 μm | 0.6 times |
| | 3 | Cross section/ STEM | Component (b) | Polymerized component (a) | 210 nm | 320 nm | 1.5 times |
| | 4 | Cross section/ STEM | Component (b) | Polymerized component (a) | 450 nm | 570 nm | 1.3 times |
| | 5 | Cross section/ STEM | Component (b) | Polymerized component (a) | 0.9 μm | 1.5 μm | 1.7 times |
| | 6 | Cross section/ STEM | Component (b) | Polymerized component (a) | 1.1 μm | 1.7 μm | 1.5 times |
| | 7 | Cross section/ STEM | Component (b) | Polymerized component (a) | 310 nm | 360 nm | 1.2 times |
| Comparative Ex | 1 | Cross section/ STEM | Component (b) | Polymerized component (a) | 1.6 μm | Fused | — |
| | 2 | Cross section/ SEM | Component (b) | Polymerized component (a) | 1.2 μm | 2.8 μm | 2.3 times |
| | 3 | Cross section/ STEM | Component (b) | Polymerized component (a) | 0.8 μm | 2.0 μm | 2.5 times |
| | 4 | Cross section/ STEM | Component (b) | Polymerized component (a) | 0.7 μm | 2.0 μm | 2.9 times |
| | 5 | Cross section/ STEM | Component (b) | Polymerized component (a) | 1.4 μm | 3.1 μm | 2.2 times |

As a result of observation of the phase image of the cured adhesive with a scanning probe microscope (model "JSPM-M-5200", manufactured by JEOL Ltd., under measuring mode "AFM"), it was found that the polymerized product of (a) 2-cyanoacrylic acid ester constituted the dispersed phase, and that (b) the high molecular-weight component constituted the continuous phase, in accordance with hardness of the dispersed and continuous phases.

Since the magnitude of phase delay appears as image contrast in AFM, the difference in elastic modulus was employed to distinguish which one of the polymerized product of 2-cyanoacrylic acid ester and the high molecular-weight component constituted the continuous phase or the dispersed phase of the sea-island structure.

Figure 9:
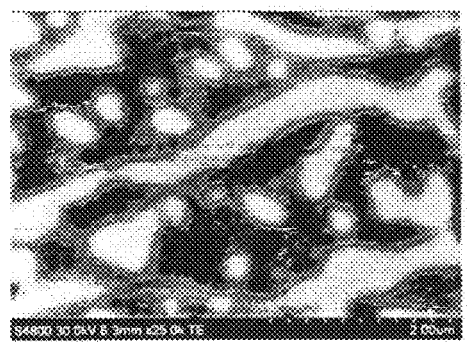
FIG. 9 shows a micrograph of the cured adhesive (after test for cold/hot cycle) obtained in Comparative Example 1, taken with a scanning electron microscope.

According to the results given in Table 3 and FIGS. 1 to 8, it can be understood that the cured adhesives of Examples 1 to 7 and of Comparative Example 1 to 5 formed the sea-island structure in the initial conditions, and that the polymerized product of 2-cyanoacrylic acid ester constituted the dispersed phase. Furthermore, it can be seen that Examples 1 to 7 did not exhibit any change in phase structure after test. However, in Comparative Examples 1 to 5, it can be understood that the dispersed phases moved towards each other and fused together to increase the maximum particle diameter of the dispersed phase to more than twice the original size. Similarly, a cured adhesive was prepared in the same manner as in [3] above by using the adhesive composition of Comparative Example 1, and then, by using a cold/hot impact testing machine, the cured adhesive was subjected to a hot/cold cycle in which it was maintained at −20° C. for an hour and then at 60° C. for an hour, and the cycle was repeated five times. The cross section of the ultrathin section of the resulting cured product was observed in the same manner as described in [4] above (in which observation method was SEM). The result is shown in FIG. 9. As shown in FIG. 9, the dispersed phases were fused together after test, and similarly to FIG. 6, the maximum particle diameter of the dispersed phase was increased to more than twice the original diameter. From Table 3, it is understood that the adhesive compositions of Example 1 to 7 undergo less changes in phase structure as compared with the adhesive composition of Comparative Example 1 at a heat treatment temperature of 80° C. or lower, and thus even when the adhesive compositions according to the present invention represented by Examples 1 to 7 are heated to 60° C., they exhibit less change in phase structure as compared with the adhesive composition of Comparative Example 1. Thus, it is clearly understood that the rate of change of the maximum particle diameter of the dispersed phase in the adhesive compositions of the present invention falls within twice the initial size after heat treatment at 60° C.

[5] Evaluation of Cold/Hot Cycle Resistance

An aluminum plate (material designated in JIS A6061P) and a test piece made of ABS resin ("ABS-N-WN" (trade name), manufactured by Shin-Kobe Electric Machinery Co., Ltd.) were bonded together using each of the adhesive compositions obtained in Examples 1 to 7 and in Comparative Examples 1 to 5, and were allowed to stand still for curing at a temperature of 23° C. under a humidity of 60% RH for 7 days. Then, tensile shear adhesion strength (which is referred to as initial strength) was measured in accordance to JIS K 6861. Subsequently, using a cold/hot impact testing machine, the test pieces were subjected to the hot/cold cycle in which the test piece was maintained at −40° C. for an hour and then at 80° C. for an hour. After the cycle was repeated ten times, the tensile shear adhesion strength (referred to as post test strength) was then measured in a manner similar to above, and the retention rate was calculated according to the following equation. The results are given in Table 4. Similarly, the post test strength and the retention rate were obtained for a bonded test piece prepared using the adhesive composition prepared in Comparative Example 1, except that the test piece was subjected to the cold/hot cycle in which the test piece is maintained at −20° C. for 1 hour and then at 60° C. for an hour, and the cycle was repeated five times. As a result, a post test strength of 1.1 N/mm² and a retention rate of 10.9% were obtained.

Retention rate (%)=(post test strength/initial strength)×100

TABLE 4

| | | Resistance to cold/hot cycles of bonded samples | | |
|---|---|---|---|---|
| | | Initial strength (N/mm²) | Post test strength (N/mm²) | Retention rate (%) |
| Examples | 1 | 5.6 | 3.3 | 59 |
| | 2 | 3.6 | 2.4 | 67 |
| | 3 | 6.8 | 2.9 | 42 |
| | 4 | 3.7 | 2.6 | 71 |
| | 5 | 4.6 | 1.8 | 39 |
| | 6 | 6.9 | 2.1 | 31 |
| | 7 | 6.3 | 3.9 | 62 |
| Comparative Examples | 1 | 10.9 | 0.1 | 1 |
| | 2 | 7.3 | 0.2 | 3 |
| | 3 | 5.5 | 0.2 | 4 |
| | 4 | 7.6 | 0 | 0 |
| | 5 | 3.2 | 0.1 | 3 |

According to the results shown in Table 4, the adhesive compositions obtained in Examples 1 to 7 possess sufficiently high cold/hot cycle resistance. On the other hand, it is understood that the adhesive compositions obtained in Comparative Examples 1 to 5 are inferior because they exhibit low post test strength despite of high initial strength.

Conclusively, by comparing the results shown in Table 3, Table 4, and FIGS. 1 to 9, it can be understood that the adhesive compositions which yield cured adhesives having a sea-island structure comprising the dispersed phase of the polymerization product of the 2-cyanoacrylic acid ester and in which the rate of change of the maximum particle diameter of the dispersed phase remains within twice the initial size after a heat treatment of 60° C., even more, after a heat treatment of 80° C., exhibit an excellent cold/hot cycle resistance of adhesion strength (see Examples 1 to 7). On the other hand, adhesive compositions which yield cured adhesives having a sea-island structure comprising the dispersed phase of the polymerization product of the 2-cyanoacrylic acid ester, but whose dispersed phase undergoes a size change in maximum particle diameter of more than twice after the heat treatment, exhibit the lowered post test strength despite of the high initial strength (see Comparative Examples 1 to 5).

INDUSTRIAL APPLICABILITY

The present invention can be utilized as a so-called instantaneous adhesive containing 2-cyanoacrylic acid ester, not only in household applications and medical fields, but also in a wide range of products and technical fields including various types of industries. It is particularly useful for applications in which durability such as cold/hot cycle resistance are required.

The invention claimed is:
1. An adhesive composition which comprises
(a) a 2-cyanoacrylic acid ester,
(b) a high molecular weight component compatible with the 2-cyanoacrylic acid ester,
(c) a multifunctional 2-cyano-3-vinylacrylic acid ester having 2 or more 2-cyano-3-vinylacryloyl groups, and
(d) an onium salt represented by the following general formula (1):

$$C^+A^- \qquad (1)$$

wherein $C^+$ represents an onium cation and $A^-$ represents an anion which does not substantially initiate polymerization of the 2-cyanoacrylic acid ester, and
in which the contents of the components (b), (c), and (d) are from 2 to 50 parts by mass, from 1 to 200 parts by mass, and from 0.01 to 5 parts by mass, respectively, relative to 100 parts by mass of the component (a).

2. The adhesive composition according to claim 1, wherein the high molecular-weight component (b) is a copolymer resulting from a monomer capable of forming a polymer slightly soluble in the 2-cyanoacrylic acid ester and a monomer capable of forming a polymer soluble in the 2-cyanoacrylic acid ester.

3. The adhesive composition according to claim 2, wherein the monomer capable of forming a polymer slightly soluble in the 2-cyanoacrylic acid ester is at least one selected from the group consisting of ethylene, propylene, isoprene, and butadiene, and the monomer capable of forming a polymer soluble in the 2-cyanoacrylic acid ester is at least one of acrylic acid esters and methacrylic acid esters.

4. The adhesive composition according to claim 1, wherein the multifunctional 2-cyano-3-vinylacrylic acid ester (c) is selected from the group consisting of an ester of 2-cyano-3-vinylacrylic acid with a polyoxyalkylene polyol, a polyester polyol, a polycarbonate polyol, a polyurethane polyol, a polyamide polyol, a polyester polyimide polyol, an acrylic polyol, a polybutadiene polyol, a hydrogenated polybutadiene polyol, an ethylene-butylene copolymer polyol, a polyisoprene polyol, a hydrogenated polyisoprene polyol, a polyvinyl butyral, a polyvinyl formal, a polyvinyl alcohol, a phenolic resin, and a silane or siloxane compound having hydroxyl groups on both terminals thereof.

5. The adhesive composition according to claim 1, wherein the number average molecular weight of the multifunctional 2-cyano-3-vinyl-acrylic acid ester (c) is from 1000 to 50000.

6. The adhesive composition according to claim 1, wherein the anion $A^-$ of the onium salt represented by the general formula (1) is hydrogen sulfate anion, hydrogen sulfite anion, a sulfonate anion represented by $R^1SO_3^-$ wherein $R^1$ represents an alkyl group, perfluoroalkyl group having 1 to 10 carbon atoms, vinyl group, aryl group, perfluoroaryl group, or halogen atom; or a bis(substituted sulfonyl)imide anion represented by $(R^2SO_2)_2N^-$ wherein $R^2$ represents an alkyl group, perfluoroalkyl group having 1 to 10 carbon atoms, or aryl group.

7. The adhesive composition according to claim 1, which, after being cured, forms a sea-island structure comprising a dispersed phase resulting from polymerization product of the 2-cyanoacrylic acid ester (a) and a continuous phase resulting from the high molecular-weight component (b), wherein the dispersed phase exhibits a rate of change of the maximum particle diameter of not more than twice after thermal treatment at 60° C.

8. The adhesive composition according to claim 1, wherein the high molecular-weight component (b) is a copolymer resulting from a monomer capable of forming a polymer slightly soluble in the 2-cyanoacrylic acid ester and a monomer capable of forming a polymer soluble in the 2-cyanoacrylic acid ester, and the number average molecular weight of the multifunctional 2-cyano-3-vinyl-acrylic acid ester (c) is from 1000 to 50000.

9. The adhesive composition according to claim 8, wherein the monomer capable of forming a polymer slightly soluble in the 2-cyanoacrylic ester comprises ethylene, propylene, isoprene, butadiene, chloroprene, 1-hexene, cyclopentene, or any combination thereof, and wherein the monomer capable of forming a polymer soluble in the 2-cyanoacrylic acid ester comprises acrylic acid ester(s), methacrylic acid ester(s), vinyl chloride, vinyl acetate, vinyl ether, styrene, acrylonitrile, or any combination thereof.

10. The adhesive composition according to claim 1, wherein the high molecular weight component compatible with the 2-cyanoacrylic acid ester comprises a copolymer and has a weight average molecular weight (Mw) and number average molecular weight (Mn) so that a ratio of Mw/Mn is a range of 1.0 to 10.0.

11. The adhesive composition according to claim 1, wherein the (b) a high molecular weight component compatible with the 2-cyanoacrylic acid ester comprises a polymer.

12. The adhesive composition according to claim 1, wherein the (b) a high molecular weight component compatible with the 2-cyanoacrylic acid ester comprises an acrylic acid ester-based copolymer elastomer, a styrene-butadiene copolymer-based elastomer, a polyurethane-based elastomer, a carboxylated acrylonitrile-butadiene copolymer-based elastomer; a polyester-based elastomer, an epichlorohydrin-based elastomer, an ethylene-vinyl acetate copolymer-based elastomer, or a combination of any thereof.

13. The adhesive composition according to claim 3, wherein the multifunctional 2-cyano-3-vinylacryiic acid ester (c) comprises an ester of 2-cyano-3-vinylacrylic acid with a polyoxyalkylene polyol, a polyester polyol, a polycarbonate polyol, a polyurethane polyol, a polyamide polyol, a polyester polyamide polyol, an acrylic polyol, a polybutadiene polyol, a hydrogenated polybutadiene polyol, an ethylene-butylene copolymer polyol, a polyisoprene polyol, a hydrogenated polyisoprene polyol, a polyvinyl butyral, a polyvinyl formal, a polyvinyl alcohol, a phenolic resin; or a silane or siloxane compound having hydroxyl groups on both terminals thereof.

14. A curable adhesive composition comprising
(a) a 2-cyanoacrylic acid ester,
(b) a polymer compatible with the 2-cyanoacrylic acid ester, said polymer having a number average molecular weight in a range of 5,000 to 500,000,
(c) a multifunctional 2-cyano-3-vinylacrylic acid ester having 2 or more 2-cyano-3-vinylacryloyl groups, wherein the number average molecular weight of the multifunctional 2-cyano-3-vinyl-acrylic acid ester (c) is from 1000 to 50000, and
(d) an onium salt represented by the following general formula (1):

$$C^+A^- \qquad (1)$$

wherein, $C^+$ represents an onium cation and $A^-$ represents an anion comprising a hydrogen sulfate anion, a hydrogen sulfite anion, a sulfonate anion represented by $R^1SO_3^-$ wherein $R^1$ represents an alkyl group, a perfluoroalkyl group having 1 to 10 carbon atoms, a vinyl group, an aryl group; a perfluoroaryl group, a halogen atom, or a bis(substituted sulfonyl)imide anion represented by $(R^2SO_2)_2N^-$ wherein $R^2$ represents an alkyl group, a perfluoroalkyl group having 1 to 10 carbon atoms, or an aryl group, and wherein the contents of the components (b), (c), and (d) are from 2 to 50 parts by mass, from 1 to 200 parts by mass, and from 0.01 to 5 parts by mass, respectively, relative to 100 parts by mass of the component (a).

15. The adhesive composition according to claim 14, wherein the (b) the polymer comprises a copolymer and has a weight average molecular weight (Mw) and number average molecular weight (Mn) so that a ratio of Mw/Mn is a range of 1.0 to 10.0.

16. The adhesive composition according to claim 14, wherein the (b) polymer comprises a copolymer of a first monomer comprising ethylene, propylene, isoprene, butadiene, chloroprene, 1-hexene, cyclopentene, or any combination thereof, and a second monomer comprising an acrylic acid ester(s), methacrylic acid ester(s), vinyl chloride, vinyl acetate, vinyl ether, styrene, acrylonitrile, or any combination thereof.

17. The adhesive composition according to claim 14, wherein the (b) polymer comprises an acrylic acid ester-based copolymerelastomer, a styrene-butadiene copolymer-based elastomer, a polyurethane-based elastomer, a carboxylated acrylonitrile-butadiene copolymer-based elastomer, a polyester-based elastomer, an epichlorohydrin-based elastomer, an ethylene-vinyl acetate copolymer-based elastomer, or a combination of any thereof.

18. The adhesive composition according to claim 14, wherein the multifunctional 2-cyano-3-vinylacrylic acid ester (c) comprises an ester of 2-cyano-3-vinylacrylic acid with a polyoxyalkylene polyol, a polyester polyol, a polycarbonate polyol, a polyurethane polyol, a polyamide polyol, a polyester polyamide polyol, an acrylic polyol, a polybutadiene polyol, a hydrogenated polybutadiene polyol, an ethylene-butylene copolymer polyol, a polyisoprene polyol, a hydrogenated polyisoprene polyol, a polyvinyl butyral, a polyvinyl formal, a polyvinyl alcohol, a phenolic resin, or a silane or siloxane compound having hydroxyl groups on both terminals thereof.

19. The adhesive composition according to claim 14, wherein the (b) polymer comprises an acrylic acid ester-based copolymerelastomer, a styrene-butadiene copolymer-based elastomer, a polyurethane-based elastomer, a carboxylated acrylonitrile-butadiene copolymer-based elastomer, a polyester-based elastomer, an epichlorohydrin-based elastomer, an ethylene-vinyl acetate copolymer-based elastomer, or a combination of any thereof, and wherein the multifunctional 2-cyano-3-vinylacrylic acid ester (c) comprises an ester of 2-cyano-3-vinylacrylic acid with a polyoxyalkylene polyol, a polyester polyol, a polycarbonate polyol, a polyurethane polyol, a polyamide polyol, a polyester polyamide polyol, an acrylic polyol, a polybutadiene polyol, a hydrogenated polybutadiene polyol, an ethylene-butylene copolymer polyol, a polyisoprene polyol, a hydrogenated polyisoprene polyol, a polyvinyl butyral, a polyvinyl formal, a polyvinyl alcohol, a phenolic resin, or a silane or siloxane compound having hydroxyl groups on both terminals thereof.

20. A cured product comprising a cured adhesive composition, wherein, before curing, the adhesive composition is curable and comprises
(a) a 2-cyanoacrylic acid ester,
(b) a polymer compatible with the 2-cyanoacrylic acid ester,
(c) a multifunctional 2-cyano-3-vinylacrylic acid ester having 2 or more 2 cyano-3-vinylacryloyl groups, and
(d) an onium salt represented by the following general formula (1):

$$C^+A^- \qquad (1)$$

in which C⁺ represents an onium cation and A⁻ represents an anion provided that polymerization of the 2-cyanoacrylic acid ester is avoided, and wherein the amounts of the components (b), (c) and (d) are from 2 to 50 parts by mass, from 1 to 200 parts by mass, and from 0.01 to 5 parts by mass, respectively, relative to 100 parts by mass of the component (a), and said cured product has a continuous phase resulting from the (b) polymer and has a dispersed phase dispersed within said continuous phase, said dispersed phase resulting from the polymerization product of the 2-cyanoacrylic acid ester (a), and said dispersed phase exhibiting a rate of change of the maximum particle diameter of not more than twice after thermal treatment at 6000.

* * * * *